Jan. 28, 1964   A. W. BAIRD   3,119,948
ELECTRODE FEED DEVICE
Filed Jan. 3, 1961
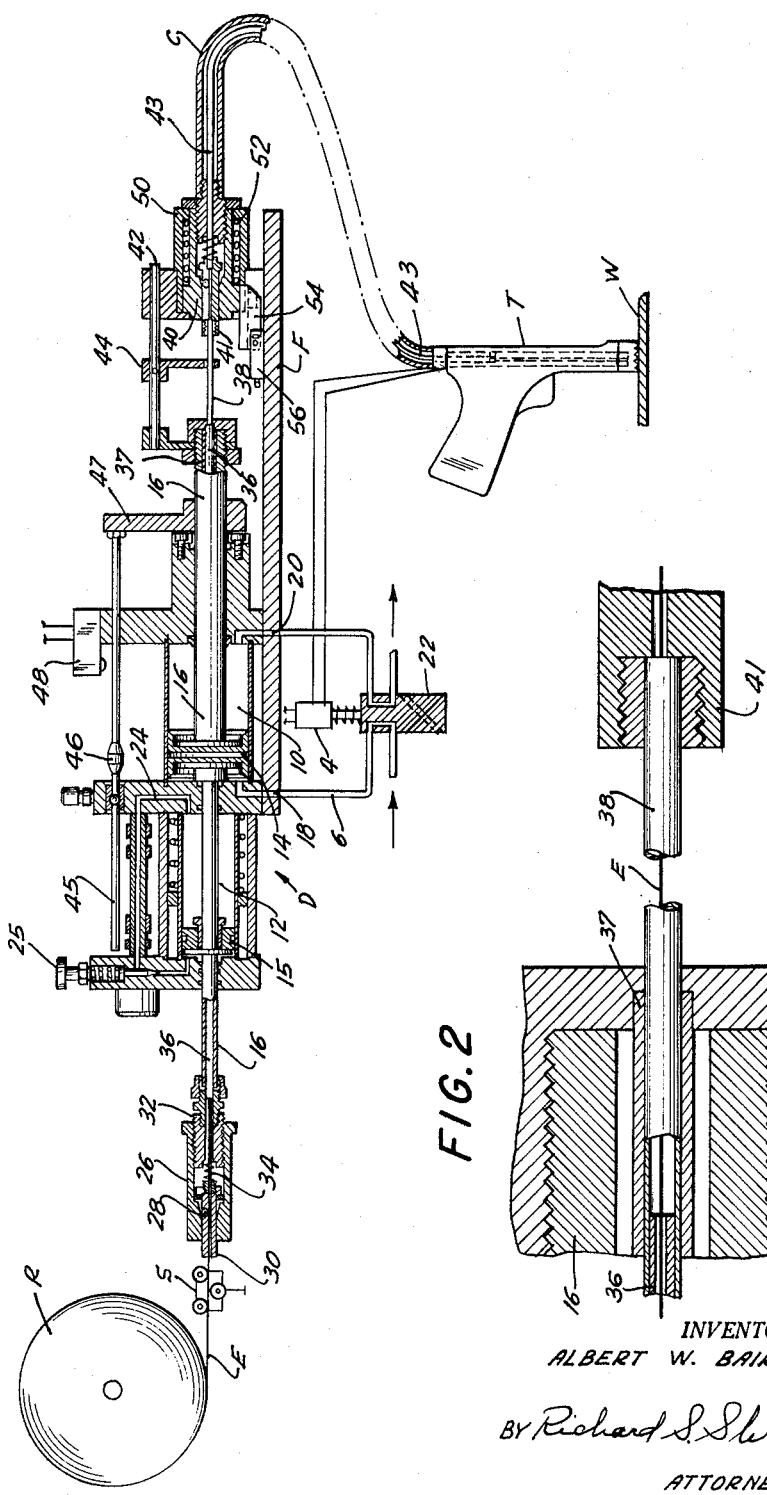
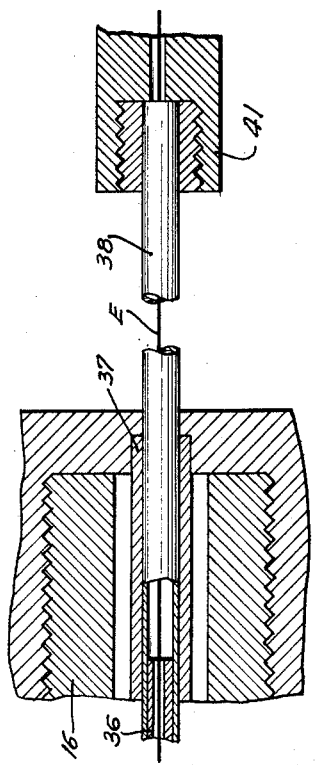
INVENTORS
ALBERT W. BAIRD
BY Richard S. Shreve Jr.
ATTORNEY 3,119,948
ELECTRODE FEED DEVICE
Albert W. Baird, Cranford, N.J., assignor to Union Carbide Corporation, a corporation of New York
Filed Jan. 3, 1961, Ser. No. 80,361
9 Claims. (Cl. 314—101)

This invention relates to an electrode feeder and more particularly to a means for feeding a consumable welding electrode into the arc zone.

Prior to this invention, the most common system for driving welding electrode wires for a semiautomatic and automatic electric welding operation consisted of an electronic governor controlled motor in combination with a pair of feed rolls. Such a system had several inherent shortcomings. Usually, variations in electrode feed speed at the start of the welding operation were present due to the finite period of time necessary for the motor to accelerate to the desired speed. Further difficulty occurred at the instant when drag forces on the wire, that is, the friction forces tending to oppose the wire feed were of such magnitude, either instantaneous or continuous, so that the electronic governor could not adequately compensate for said forces. As a result, wide fluctuations in the electrode feed speed were present and consequently the rate of consumable electrode deposition was inconsistent. As an aftermath of this condition, the welding arc characteristics were also adversely affected.

Still another troublesome element presented itself when soft electrodes such as aluminum or magnesium were used in a welding operation. Most frequently, scoring and chipping of the electrode occurred as it was fed through the feed rolls and subsequently the scored surfaces increased the friction drag forces which tended to aggravate the above described condition. In addition, these chips accumulated in the wire conduit or guide system downstream from the drive roll; and frequently caused binding and erratic feed.

Furthermore, electrode feed systems which incorporate the use of feed rolls require a critical alignment of the feed roll with the pressure roll. This is required in order to minimize any tendency for the feed roll to impart a permanent set to the welding electrode. In addition, both the feed roll and the pressure roll must be concentric within close tolerances so as to maintain a constant pressure upon the wire. Otherwise, as the feed roll rotates, the wire can be conceivably crushed at one point and as a result, loss of contact pressure at another point in travel along the electrode is experienced. Such concentricity is very difficult to completely attain in mechanical systems of the type employed prior to the invention.

The main objects of the present invention are to avoid the above difficulties, and to improve the speed control of the electrode feed.

Other objects are to eliminate time lapse between arc initiation and full operational electrode feed speed, to eliminate the formation of kinks in the electrode, to provide a source of reciprocating linear force for driving the electrode, and to provide weld anti-stick and electrode retract timing, particularly for spot welding.

According to the present invention, a hollow piston construction is provided for intermittently introducing a consumable electrode into the weld zone, driven by a pneumatic system with in line hydraulic speed check control to regulate the electrode feed.

Preferably the hollow piston carries a one way electrode chuck to propel the electrode through a stationary one-way chuck. The hydraulic control is preferably a cylinder having a piston on the hollow rod, and a bypass around the piston containing a control valve.

The hollow rod preferably contains a guide tube telescoping into a stationary guide tube associated with the stationary chuck, and an insulating liner is mounted inside the hollow rod and outside of the telescoping tubes.

Preferably, a solenoid valve mechanism is provided for the drive cylinder, with a limit switch control actuated by a cam moving in unison with the hollow rod.

In the drawings:
FIG. 1 is a side elevation largely in vertical longitudinal section through welding apparatus employing the preferred embodiment of the present invention; and
FIG. 2 is an enlarged detailed section of part of the apparatus shown in FIG. 1.

The welding electrode wire E is fed off of a supply R through a three roll wire straightener S to the drive mechanism D, which propels it on through flexible conduit C to the torch T.

The drive mechanism D comprises a frame F in which are mounted a drive cylinder 10 and a following control cylinder 12. The cylinder 10 has a drive piston 14 and the cylinder 12 has a control piston 15, both pistons being mounted in tandem on a hollow piston rod 16.

The respective ends of the drive cylinder 10 are alternately supplied with, and exhausted of, compressed air through ports 18 and 20, under the control of a four-way solenoid valve indicated diagrammatically at 22. The control cylinder 12 is filled on both sides of its piston 15 with a non-compressible or hydraulic fluid such as oil, and the respective ends thereof are connected by a bypass 24 containing a finely adjustable needle valve 25.

Mounted in the entrance or after end of the hollow piston rod 16 is a one-way or overrunning clutch 26, the form shown comprising a forwardly diverging conically bored outer sleeve engaging an annular series of balls 28 in a non-conducting ball retainer 30 having a central cylindrical bore through which the electrode E passes. An adjusting nut 32 engaging a coil compression spring 34 controls the pressure exerted on the electrode E by the balls 28.

The ball retainer 30 is secured on the rear end of a guide tube 36 of a diameter slightly larger than the electrode E. The tube 36 extends inside the hollow piston rod 16, and a nylon liner 37 extends inside the entire length of the rod 16 outside of the guide tube 36 to insulate it therefrom. The front end of the guide tube 36 is telescoped into a larger relatively stationary guide tube 38. The maximum length of the outer stationary tube 38 is determined by the maximum stroke of the piston assembly. The inner guide tube 36 is of sufficient length to extend through the hollow piston rod 16 and on inside the larger tube 38 to be overlapped thereby at all times. The nylon liner 37 carried by the hollow piston rod 16 passes outside of the outer stationary guide tube 38 as the smaller guide tube 36 passes inside thereof, to insulate both of the telescoping guide tubes from the piston rod.

The forward end of the outer guide tube 38 is secured to the non-conducting ball retainer of a stationary one-way or overrunning clutch 40 secured in the delivery end of the frame F. This clutch is similar to the clutch 26, except that the rear end of the ball retainer protrudes outside of the rear of the bore in the clutch sleeve, as at 41. A nylon liner 43 is secured inside the forward end of the ball retainer and extends through flexible conduit C into the guide tube of torch T as an insulator, and to compensate for any slack of the electrode in the conduit. Elimination of such slack obtains positive control over the retract of the electrode E.

The forward end of the hollow piston rod 16 has secured thereto an offset pusher rod 42 slidably mounted in the frame F parallel to the tube 38. A cam 44 is adjustably secured in position on the pusher rod 42, and slidable along the tube 38 into engagement with the ball retainer end 41.

The hollow piston rod 16 has secured thereto a yoke 47 which carries a pull rod 45 slidable in the frame F parallel to the rod 16. A trip cam 46 is adjustably mounted on the pull rod 45 for engagement with a limit switch 48 mounted on the frame F in the path of the trip cam and in circuit with the four-way solenoid valve 22.

In operation, as the consumable welding electrode E to fed off the reel R, it proceeds through the three roll straightener S which minimizes the friction of the electrode through the telescoping guide tubes 36 and 38 respectively. After a sufficient amount of electrode wire E is fed into the torch T, the operator pulls the trigger of the torch T, which turns on the welding current and simultaneously energizes the four-way solenoid valve 22 to supply pressurized air through the port 18. This moves the piston 14 and its hollow rod 16 forward. The one-way clutch 26 carried by the rear end of the rod 16 grips the electrode E and drives a predetermined length of electrode through the torch T to strike and maintain an arc with the workpiece.

As the pneumatic piston 14 moves forward, the hydraulic piston 15 also moves forward, forcing the non-compressible fluid through the needle valve 25 in the bypass 24, thus providing a controlled and uniform forward movement of the hollow piston rod 16. Near the end of the forward stroke, the cam 44 on the push rod 42 engages the protruding end of the ball retainer and pushes it into the clutch sleeve and releases the clutch.

At the end of the forward stroke, the cam 46 on the pull rod 45 trips the limit switch 48, which de-energizes the solenoid of four-way valve 22 and initiates the return stroke. Inasmuch as the cam 44 is holding the forward clutch 40 open for a travel equal to the length of the protrusion 41, the friction of the moving inner guide tube 36 on the electrode E therein is sufficient to retract the electrode that amount. As the cam 44 leaves the protrusion 41, the clutch 40 closes and holds the electrode stationary while the piston rod 16 and the inner guide 36 proceed on to complete the return stroke.

At the end of the return stroke, the parts all remain stationary until the operator again pulls the trigger of the torch T to energize the solenoid of four-way valve 22 to initiate the next forward stroke to repeat the cycle.

During that period in time when the operator seeks to attain optimum welding conditions, the welding wire could at times, burn-back and fuse to the guide tube 36. Such an occurrence is undesirable since the forward movement of hollow rod 16 tends to continue to feed welding wire in the forward direction, irrespective of previously mentioned burn-back. As such wire is driven in the forward direction, the unsupported telescoping section 38 starts to deform and ultimately is rendered inoperative because of buckling, and continues to deform until the end of the forward stroke of hollow rod 16. Thereafter, welding is impossible until a new telescoping member 38 is inserted.

To overcome this difficulty, stationary ball chuck 40 has been mounted in a spring loaded socket 50, having a spring 52 having a spring force less than that column strength of telescoping member 38. Hence, in the event of a burn-back, the spring socket 50 prevents the telescoping member 38 from buckling by yielding to permit an arm 54 carried by chuck 40 to trip limit switch 56 which automatically actuates the solenoid valve 22 and reverses the forward motion of hollow rod 16. The welding wire E remains in stationary and cannot travel in the forward direction.

Now it is necessary for the operator to replace guide tube 36 in order to resume welding. At such time, the welding cycle is initiated in the customary manner.

What is claimed is:

1. Electrode welding wire fluid pressure feed device comprising a frame, a drive cylinder mounted in said frame and having a piston, a hollow rod driven by said piston and through which the electrode welding wire passes, a stationary one-way clutch mounted in said frame in the path of the electrode welding wire outside of said cylinder, a wire guide tube between said hollow rod and said stationary clutch, a moving one-way clutch carried by said hollow rod, and means for supplying fluid under pressure to said piston in said cylinder to drive said hollow rod and moving clutch for propelling the electrode welding wire through said stationary clutch.

2. Apparatus for feeding electrode wire from a supply through a flexible conduit to a welding gun, comprising a frame having one end receiving the wire from said supply and the other end connected to said flexible conduit through which the wire extending continuously from said entrance is delivered to said gun, a hollow element longitudinally slidably mounted in said frame between said entrance and said conduit and through which the wire passes on its way from said entrance to said conduit, means for reciprocating said hollow element, means mounted in said frame beyond said hollow element receiving the wire therefrom and engaging the wire to prevent return movement thereof, a wire guide tube between said hollow element and said return movement preventing means, and means carried by said hollow element and engaging the wire therein for imparting longitudinal thrust to successive portions of said wire to drive said wire from said entrance toward said conduit for propelling said wire through said wire guide tube and said return preventing means on to said gun.

3. Electrode welding wire fluid pressure feed device comprising a frame, a drive cylinder mounted in said frame and having a piston, a hollow rod driven by said piston and through which the electrode welding wire passes, a stationary one-way clutch mounted in said frame in the path of the electrode welding wire, a moving one-way clutch carried by said hollow rod, means for supplying fluid under pressure to said piston in said cylinder to drive said hollow rod and moving clutch for propelling the electrode welding wire through said stationary clutch, a hydraulic cylinder having a piston driven by said hollow rod, said hydraulic cylinder having a by-pass around its piston, and a valve in said by-pass for controlling the movement of said hollow rod.

4. Electrode welding wire fluid pressure feed device comprising a frame, a drive cylinder mounted in said frame and having a piston, a hollow piston rod driven by said piston and through which the electrode welding wire passes, an electrode welding wire guide tube secured inside said hollow rod, a stationary one-way clutch mounted in said frame in the path of the electrode welding wire, a stationary guide tube secured to a part of said stationary clutch, and slidably receiving said moving rod guide tube, a moving one-way clutch carried by said hollow rod, means for supplying fluid under pressure to said piston in said cylinder to drive said hollow rod and moving guide tube and clutch for propelling the electrode welding wire through said stationary clutch.

5. Electrode welding wire fluid pressure feed device comprising a frame, a drive cylinder mounted in said frame and having a piston, a hollow rod driven by said piston and through which the electrode welding wire passes, an electrode guide tube secured inside said hollow rod, a stationary one-way clutch mounted in said frame in the path of the electrode welding wire, a stationary guide tube slidably receiving said moving guide tube, a moving one-way clutch carried by said hollow rod, an insulating liner inside said hollow rod and outside of said guide tubes, means for supplying fluid under pressure to said piston in said cylinder to drive said hollow rod and moving guide tube and clutch for propelling the electrode welding wire through said stationary clutch.

6. Electrode welding wire fluid pressure device comprising a frame, a drive cylinder mounted in said frame and having a piston, a hollow rod driven by said piston and through which the electrode welding wire passes, a stationary one-way clutch mounted in said frame in the path of the electrode welding wire and having releasing means, a moving one-way clutch carried by said hollow rod, means for supplying fluid under pressure to said piston in said cylinder to drive said hollow rod and moving clutch for propelling the electrode welding wire through said stationary clutch, a trip member moving in unison with said hollow rod near the end of its stroke for actuating said releasing means, said trip member retaining said releasing means for an initial part of the return stroke of said hollow rod to permit retraction of the electrode.

7. Electrode feed device comprising a drive cylinder having a piston with a hollow rod through which the electrode passes, a stationary one way clutch in the path of the electrode, a moving one way clutch carried by said hollow rod for propelling the electrode through said stationary clutch, a solenoid valve mechanism for controlling admission of pressurized fluid to, and exhaust from, said drive cylinder, limit switch means for energizing said solenoid, and cam means driven by said hollow rod for actuating said limit switch means at the respective ends of the stroke.

8. Electrode welding wire feed device comprising a frame, a drive cylinder mounted in said frame and having a hollow piston rod through which the wire passes, a stationary one way clutch mounted in said frame in the path of the wire, a moving one way clutch carried by said hollow rod for propelling the wire through said stationary clutch, a torch for applying the wire to a workpiece, a flexible conduit connected to said frame for conducting the wire propelled by said moving clutch to said torch, a solenoid valve for controlling admission of pressurized fluid to said drive cylinder, a trigger on said torch for energizing said valve to admit fluid to one end of said cylinder for a stroke in one direction, a cam driven by said piston for said stroke, and a limit switch mounted on said frame and actuated by said cam for energizing said valve for admitting fluid to the other end of said cylinder for a return stroke.

9. Electrode feed device comprising a drive cylinder having a piston, a hollow rod driven by said piston and through which the electrode passes, a stationary one way clutch mounted in the path of the electrode beyond said cylinder, and a moving one way clutch carried by said hollow rod ahead and outside of said cylinder for propelling the electrode through said stationary clutch.

References Cited in the file of this patent

UNITED STATES PATENTS

| | | |
|---|---|---|
| 434,204 | Rothlisberger | Aug. 20, 1890 |
| 1,407,761 | Langfield | Feb. 28, 1922 |
| 2,817,749 | Flood | Dec. 24, 1947 |
| 2,586,536 | Haller | Feb. 19, 1952 |
| 2,634,974 | Chuy | Apr. 14, 1953 |
| 3,038,647 | Grimm | June 12, 1962 |

FOREIGN PATENTS

| | | |
|---|---|---|
| 294,773 | Switzerland | Feb. 1, 1954 |